US008406694B2

(12) United States Patent
Lubetzky et al.

(10) Patent No.: US 8,406,694 B2
(45) Date of Patent: Mar. 26, 2013

(54) CHANNEL DISCOVERY PROTOCOL

(75) Inventors: Eyal Lubetzky, Seattle, WA (US); Ori Gurel-Gurevich, Redmond, WA (US); Thomas Moscibroda, Redmond, WA (US); Joseph Yossi Azar, Ramat-Hasharon (IL)

(73) Assignee: Microsoft Corporation, Redmond, WA (US)

( * ) Notice: Subject to any disclaimer, the term of this patent is extended or adjusted under 35 U.S.C. 154(b) by 347 days.

(21) Appl. No.: 12/814,394

(22) Filed: Jun. 11, 2010

(65) Prior Publication Data

US 2011/0306301 A1   Dec. 15, 2011

(51) Int. Cl.
*H04B 15/00* (2006.01)
*H04B 17/00* (2006.01)
(52) U.S. Cl. ....... 455/62; 455/63.3; 455/67.11; 370/431
(58) Field of Classification Search .................... 455/62; 370/329
See application file for complete search history.

(56) References Cited

U.S. PATENT DOCUMENTS

| | | | | |
|---|---|---|---|---|
| 5,907,812 | A | * | 5/1999 | Van De Berg ............... 455/461 |
| 5,963,848 | A | * | 10/1999 | D'Avello ...................... 455/62 |
| 6,792,052 | B1 | | 9/2004 | Johansson |
| 7,539,759 | B2 | | 5/2009 | Narayanan et al. |
| 2003/0072321 | A1 | * | 4/2003 | Salloum Salazar et al. .. 370/442 |
| 2006/0217137 | A1 | * | 9/2006 | Kushalnagar et al. ........ 455/501 |
| 2007/0141988 | A1 | | 6/2007 | Kuehnel et al. |
| 2009/0135856 | A1 | | 5/2009 | Gha et al. |
| 2009/0154485 | A1 | * | 6/2009 | Park et al. ..................... 370/438 |
| 2010/0054138 | A1 | | 3/2010 | Gips et al. |
| 2010/0054236 | A1 | | 3/2010 | Guvenc et al. |
| 2010/0111006 | A1 | * | 5/2010 | Zhai et al. ..................... 370/329 |
| 2011/0250858 | A1 | * | 10/2011 | Jain et al. ...................... 455/120 |

OTHER PUBLICATIONS

Li et al, "A Frequency Hopping Spread Spectrum Transmission Scheme for Uncoordinated Cognitive Radios", retrieved on Apr. 12, 2010 at <<http://ieeexplore.ieee.org/stamp/stamp.jsp?tp=&arnumber=4960091>>, IEEE Computer Society, Proceedings of International Conference on Acoustics, Speech and Signal Processing (ICASSP), 2009, pp. 2345-2348.

Li et al, "Optimal Channel Width Adaptation, Logical Topology Design, and Routing in Wireless Mesh Networks", retrieved on Apr. 12, 2010 at <<http://www.hindawi.com/journals/wcn/2009/940584.html>>, Hindawi Publishing, EURASIP Journal on Wireless Communications and Networking, vol. 2009, Article ID 940584, Mar. 16, 2009, 12 pgs.

Roche, "Time Synchronization in Wireless Networks", retrieved on Apr. 12, 2010 at <<http://www.cs.wustl.edu/~jain/cse574-06/ftp/time_sync/index.html#Section3.0>>, Apr. 23, 2006, pp. 12 pgs.

* cited by examiner

*Primary Examiner* — Temesgh Ghebretinsae
*Assistant Examiner* — Gennadiy Tsvey
(74) *Attorney, Agent, or Firm* — Lee & Hayes, PLLC

(57) ABSTRACT

A computing device configured to select a channel that is open in a local environment of the computing device and to attempt to communicate with another computing device on the selected available channel is described herein. The computing device selects the available channel based on selection probabilities for a plurality of available channels, the selection probabilities defined by an exponentially decaying distribution curve.

19 Claims, 4 Drawing Sheets

CHANNEL DISCOVERY PROTOCOL

BACKGROUND

Advances in wireless communication have enabled an increasing number of devices to wirelessly communicate with one another. In addition to mobile devices and computers, other devices such as headsets, microphones, remote controls, and televisions wirelessly communicate with one another. While wireless communication takes many forms, it often involves use of a channel within a frequency spectrum, typically referred to as a "radio frequency." Certain frequency spectrums are reserved for specific types of communication. Other frequency spectrums (for example the White-Space spectrum in the ultra high frequency television (UHF-TV) bands) give priority to certain types of devices and communications (i.e. so-called primary users) but allow others (secondary users) to communicate on channels that are not currently in use by any primary user.

In many cases, two communication devices have multiple channels to choose from for communication. Here, a channel is defined as a part of the frequency spectrum, i.e., a center frequency and a channel width. For various reasons, it is possible that some of the channels may not be available (or open) at one or more of the communicating devices, thus preventing such a device to transmit on this channel or communicate effectively on it. For example, this can be due to legal requirements in the white-space spectrum in case a primary user is using this channel. Also, a channel may be very busy with other traffic.

The problem is that in many cases, two wireless devices want to communicate with one another, but the channels each of them has available for communication may be different. Some channels may be available at both devices, whereas other channels may only be available at one of the devices, while still others may not be available at any of the devices. The difficulty is that a-priori, neither of the devices has knowledge about which of the channels are available at the respective other device that it wants to communicate with. It only knows about the available channels at its own location, not about those at the location of the other device. In addition, in certain cases a channel may not allow communication even if it appears available for both devices, due to interferences that cannot be detected locally.

To "discover" each other, i.e., set up a reliable communication, wireless devices may utilize a protocol. Discovery is achieved when the devices communicate on some channel that is available at both devices and in an environment between the devices at the same time. In this case, the two nodes can use existing, standard protocols to set up any design communication protocol. They can either stay on the channel on which discovery occurred, or they may select any other channel based on any existing channel selection protocol.

The difficulty arises that the above discovery process should occur as quickly as possible; i.e., two or more devices should be able to find each other on an available channel quickly in order to avoid losing time (and energy). The problem is that if not done cleverly, the discovery time (=the time until two or more nodes discover each other) grows linearly in the total number of channels, which may be large. This is for example the case in the simple strategy in which the two devices periodically pick random channels until they happen to pick the same channel at the same time. Such random selection can thus consume significant user time and device energy.

SUMMARY

Computing devices configured to select available channels and communicate with each other are described herein. These computing devices wish to discover one another and lack external means of synchronizing (there is no common clock etc.). The devices resort to selecting channels hoping to converge to one same channel at a given time slot, and achieve this as quickly as possible. To achieve this goal, the computing devices each determine available channels in their local environments and select one of the available channels based on selection probabilities for the available channels. The selection probabilities are defined by a distribution curve with an exponential decay. After selecting an available channel, the computing devices attempt to communicate with each other, each attempting on the available channel that it has selected. In case the two devices selected the same channel, they can now establish communication using any existing communication protocol. In case the two devices selected two different channels, no communication is possible. In this case, the computing devices repeat the selecting and attempting until they successfully communicate. Because the computing devices select available channels based on selection probabilities defined by a curve which has an exponential decay, the total number of attempts to communicate is independent of a total number of channels.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1:
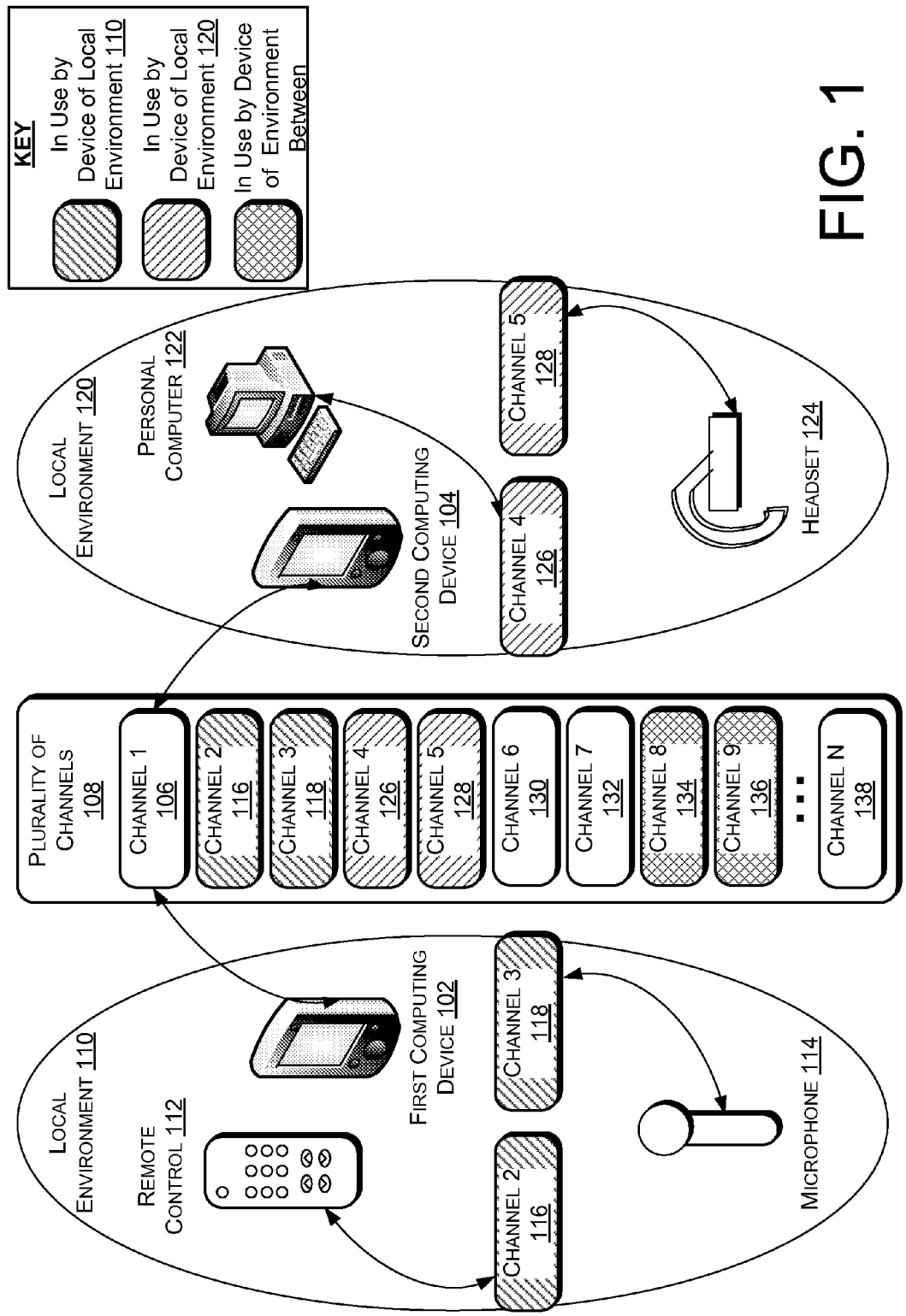
FIG. 1 illustrates a block diagram showing an overview of computing devices selecting available channels and attempting to communicate with each other via the available channel each selects, in accordance with various embodiments.

Described herein are computing devices configured to repeatedly select available channels based on selection probabilities and to attempt to communicate with each other on the channel that each selects until the computing devices successfully communicate. As used herein, "successful communication" refers to computing devices selecting a same available channel at a same time and thereby being enabled to engage in voice or data communication over the available channel, or to use any existing communication protocol to continue communication on this or any other channel that is open to both devices.

In various embodiments, each computing device determines available channels in its local environment. A channel can be "not available" for various reasons. In white space networks, a channel is blocked off (i.e., not available) if it is currently in use by a primary user, for example by a licensed wireless microphone or a TV station. In other cases, a channel may be not available due to heavy traffic on the channel or for other reasons.

Each computing device may also have availability probabilities for the local environment of the other computing device that it is attempting to communicate with and for the environment between the computing devices. Each availability probability reflects a number of available channels divided by a total number of channels. The availability probabilities may be learned over time or received from another device or devices.

The availability probabilities are used to calculate a parameter defining a distribution curve with an exponential decay that define selection probabilities for channels of each computing device determined to be open with respect to the local environment of that computing device. By utilizing selection probabilities defined by availability probabilities and a distribution curve with an exponential decay, the computing device is enabled to communicate within a number of attempts to communicate that is independent of the total number of channels.

Utilizing the selection probabilities, each computing device selects one of the available channels and attempts to communicate with another computing device over the selected available channel. The communication attempts may fail for a number of reasons. Such reasons include selection of different channels by two computing devices attempting to communicate or use of the selected "open" channel by a device external to the local environment of the computing device attempting to communicate. When the computing devices select a same channel during a same time and when that channel is open in the local environments of both computing devices and in the environment between the computing devices, the computing devices may successfully communicate with each other. Until successful communication occurs, the computing devices may repeatedly select channels and attempt to communicate on those channels.

In some embodiments, after establishing successful communication, the computing devices exchange maps of their available channels and select another, mutually available channel for further communication. The other available channel is chosen in order to preserve a uniform distribution of occupied ones of the plurality of channels.

Overview

FIG. 1 illustrates an overview of computing devices selecting available channels and attempting to communicate with each other via the available channel each selects, in accordance with various embodiments. As shown in FIG. 1, a first computing device 102 (hereinafter "computing device 102") attempts to communicate with a second computing device 104 (hereinafter "computing device 104"). Each of the computing devices 102 and 104 attempts to communicate with the other until the computing devices 102 and 104 select and communicate on a same available channel 106 at a same time. Available channel 106 is one of a plurality of channels 108, some or all of which may be in use by any number of devices. The available channel 106 is shown as "Channel 1," but may be any channel of the plurality of channels 108.

The computing device 102 is associated with a local environment 110. Within that local environment 110 there may be a number of other devices using one or more channels of the plurality of channels 108. For example, the local environment 110 may encompass a remote control 112 and a microphone 114 that respectively use "Channel 2" 116 and "Channel 3" 118 of the plurality of channels 108.

The computing device 104 is associated with a local environment 120. Within that local environment 120 there may be a number of other devices using one or more channels of the plurality of channels 108. For example, the local environment 120 may encompass a personal computer 122 and a headset 124 that respectively use "Channel 4" 126 and "Channel 5" 128 of the plurality of channels 108.

As is also shown, the plurality of channels 108 has a total of N channels, including "Channel 6" 130, "Channel 7" 132, "Channel 8" 134, "Channel 9" 136, and "Channel N" 138. As shown in FIG. 1, "Channel 8" 134 and "Channel 9" 136 are not available and may be in use by another device of the environment between the first computing device 102 and the second computing device 104.

Figure 2:
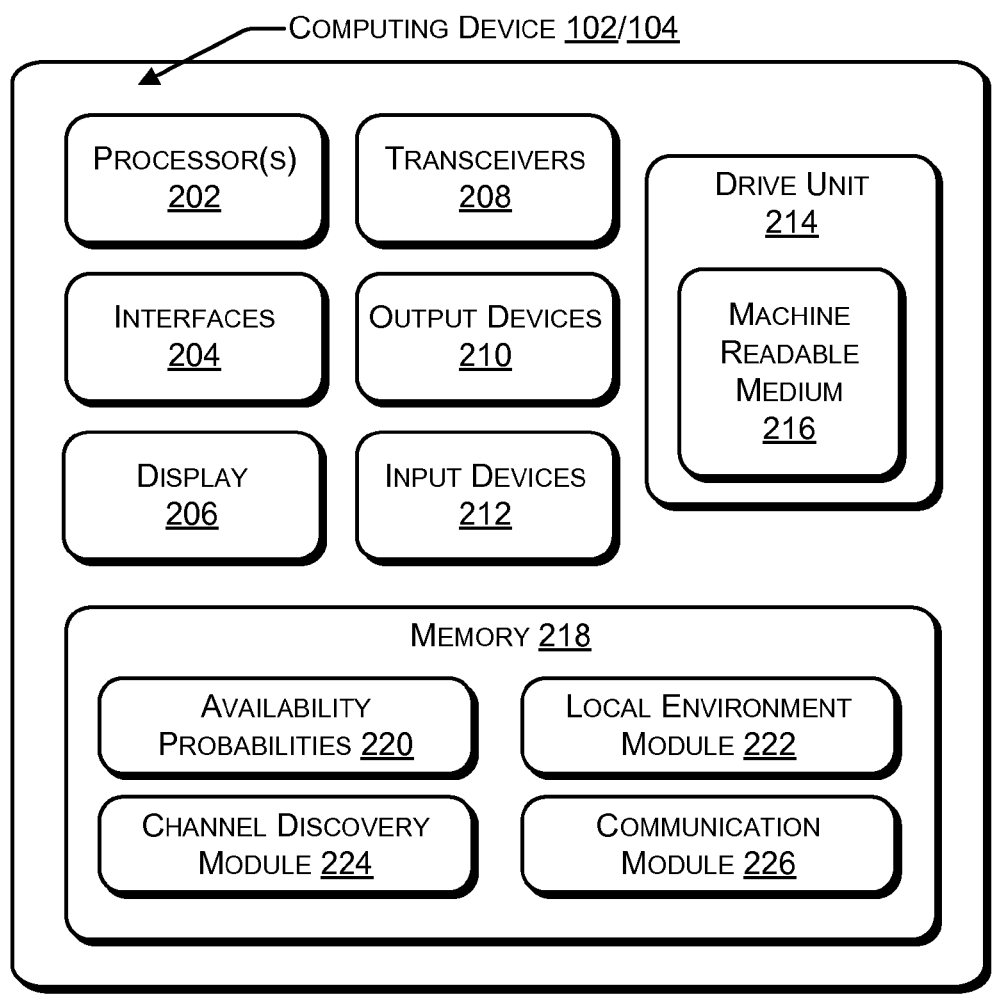
FIG. 2 illustrates a block diagram showing an example computing device, in accordance with various embodiments.

In various embodiments, the computing devices 102 and 104 may be any sort of computing devices. For example, the computing devices 102 and 104 may each be one of a mobile device, such as a cellular phone or a PDA, a personal computer (PC), a laptop computer, a workstation, a tablet computer, a television, a media player, a digital video recorder, a game device, or a set-top box, or any other sort of device. In one implementation, the computing devices 102 and 104 are different kinds of computing devices. Each of these computing devices 102 and 104 is equipped with components enabling wireless communication across a frequency spectrum, such as a radio frequency spectrum. An example computing device 102/104 including these and other components is illustrated in FIG. 2 and is described below in greater detail with reference to that figure.

The computing devices 102 and 104 attempt to communicate with each other using channels of a frequency spectrum, such as one or more of channels 108. The frequency spectrum may include only channels 108 or may also include additional channels, each channel having an associated frequency size. Additionally, the frequency spectrum may cover any range of frequencies. For example, the frequency spectrum may be a White-Space spectrum in a UHF-TV band that has a range of 512 MHz to 698 MHz. Each channel in the White-Space spectrum has a size of 6 MHz. In some implementations, these channels may be divided into sub-channels of smaller width that are then treated separately.

Also, in a number of implementations, the frequency spectrum is utilized for short range communication (e.g., a range of one mile or less) between devices. Thus, to communicate with each other using channels of the frequency spectrum, the computing devices 102 and 104 may be within a distance of one another.

In some embodiments, the frequency spectrum utilized by the computing devices 102 and 104 may either be selected by the computing devices 102 and 104 or their users, or may be a pre-programmed frequency spectrum that is automatically utilized by the computing device 102 and 104.

In addition to communications using the frequency spectrum and its channels 108, the computing devices 102 and 104 may also communicate with each other and with other devices via one or more additional networks, such as wide area networks (WANs), local area networks (LANs), personal area networks (PANs), or the Internet. Such other devices may include any number of servers, service providers, base stations, and access points. In one embodiment, communication using the channels 108 may be utilized as an alternative to WAN/LAN/PAN/Internet communication by a computing device 102 or 104 in a geographic location where WAN/LAN/PAN/Internet connectivity is not available.

In various embodiments, local environments 110 and 120 may be geographic areas centered on the computing devices 102 and 104, respectively, each of the local environments 110 and 120 having a size determined by a scanning range of its respective computing device 102 or 104. For example, if the scanning range of the computing device 102 is 10 meters, the local environment 110 would be a roughly circular area of 100π meters squared (this accounts for measurement in two dimensions; in actuality the computing device would scan in three dimensions) with the computing device 102 at the approximate center of that area. Because computing devices 102 and 104 may have different scanning ranges, the local environments 110 and 120 may cover different sized areas or spaces. The area between the local environments 110 and 120 also has a size, that size determined by the sizes of the local environments 110 and 120 and by the distance between the first computing device 102 and the second computing device 104. This area is also an environment and may include devices that utilize one or more of the plurality of channels 108.

Within each local environment 110 and 120 there may be any number of devices communicating on the same frequency spectrum that the computing devices 102 and 104 are attempting to communicate on. A number of these devices may use some or all of the channels 108 of the frequency spectrum. For example, as mentioned above, a remote control 112 may use "Channel 2" 116, a microphone 114 may use "Channel 3" 118, a personal computer 122 may use "Channel 4" 126, and a headset 124 may use "Channel 5" 128. While the remote control 112, microphone 114, personal computer 122, and headset 124 are shown as examples of devices use channels 108 of the frequency spectrum, any number of other devices may also or instead utilize some or all of the channels 108. In some embodiments, one or more types of devices may be given priority over other types of devices based, for example, on a legal requirement. If certain device types are given priority, the computing devices 102 and 104 may, in one implementation, scan only for devices of those prioritized types in determining available channels in the local environments 110 and 120.

In various embodiments, other devices located outside of the local environments 110 and 120 but between the computing devices 102 and 104 may also utilize one or more of the channels 108. For example, as mentioned above, such devices may use "Channel 8" 134 and "Channel 9" 136. If there are a total of 10 channels (i.e., "Channel N" 138 is Channel 10), then channels 1, 6, 7, and 10 would be open in both local environments 110 and 120 and in the environment in between. In this example, the computing devices 102 and 104 would only successfully communicate when they both select the same one of channels 1, 6, 7, and 10 at the same time.

As mentioned briefly above, each of the computing devices 102 and 104 selects a channel independently and attempts to communicate over that channel during a time slot, repeating the selecting and attempting at each successive time slot until successful communication is achieved. Prior to selection, each of the computing devices 102 and 104 scans its respective local environment 110 and 120 to determine channels that are available with respect to that local environment 110/120. Continuing with the above example, the computing device 102 would determine that channels 1 and 4-10 are "available" and the computing device 104 would determine that channels 1-3 and 6-10 are "available." Each of the computing devices 102 and 104 selects channels based on selection probabilities that are defined by a distribution curve which has an exponential decay, the distribution curve being defined in part based on availability probabilities. The availability probabilities utilized by the computing device 102 include an availability probability for the local environment 120 and an availability probability for the environment between the computing devices 102 and 104. The availability probabilities utilized by the computing device 104 include an availability probability for the local environment 110 and an availability probability for the environment between the computing devices 102 and 104. After selecting a channel, each computing device 102/104 attempts to communicate with the other using its selected channel. Once the computing devices 102 and 104 have successfully communicated, they exchange maps of the channels that are open in their respective local environments 110 and 120. In some embodiments, the computing devices 102 and 104 then utilize the maps to select another channel for further communication, the other available channel being switched to in order to preserve a uniform distribution of occupied ones of the plurality of channels 108. These operations of computing devices 102 and 104 are described in greater detail below.

Example Computing Device

FIG. 2 illustrates an example computing device, in accordance with various embodiments. As shown, the computing device 102/104 (hereinafter "computing device 102") may include processor(s) 202, interfaces 204, a display 206, transceivers 208, output devices 210, input devices 212, and drive unit 214 including a machine readable medium 216. The computing device 102 further includes a memory 218, the memory storing at least availability probabilities 220, a local environment module 222, a channel discovery module 224, and a communication module 226.

In some embodiments, the processor(s) 202 is a central processing unit (CPU), a graphics processing unit (GPU), or both CPU and GPU, or any other sort of processing unit.

In various embodiments, the interfaces 204 are any sort of interfaces. Interfaces 204 include any one or more of a WAN interface, a wireless LAN interface, or a near field interface. The a wireless LAN interface can include a Wi-Fi interface or a Wi-Max interface, or a Bluetooth® interface that performs the function of transmitting and receiving wireless communications using, for example, the IEEE 802.11, 802.16 and/or 802.20 standards. For instance, the computing device 102 can use a Wi-Fi interface to communicate directly with a nearby device. The near field interface can include a Bluetooth® interface or RFID for transmitting and receiving near field radio communications via a near field antenna. For example, the near field interface may be used for functions, as is known in the art, such as communicating directly with nearby devices that are also, for instance, Bluetooth® or RFID enabled. A reader/interrogator may be incorporated into the computing device 102.

In various embodiments, the display 206 is a liquid crystal display or any other type of display commonly used in telecommunication devices. For example, display 206 may be a touch-sensitive display screen, and can then also act as an input device or keypad, such as for providing a soft-key keyboard, navigation buttons, or the like.

In some embodiments, the transceivers 208 include any sort of transceivers known in the art. For example, transceivers 208 may include a radio transceiver and interface that performs the function of transmitting and receiving radio frequency communications via an antenna. The radio interface facilitates wireless connectivity between the computing device 102 and the computing device 104 as well as wireless connectivity with various cell towers, base stations and/or access points.

In some embodiments, the output devices 210 include any sort of output devices known in the art, such as a display (already described as display 206), speakers, a vibrating mechanism, or a tactile feedback mechanism. Output devices 210 also include ports for one or more peripheral devices, such as headphones, peripheral speakers, or a peripheral display.

In various embodiments, input devices 212 include any sort of input devices known in the art. For example, input devices 212 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The machine readable medium 216 stores one or more sets of instructions (e.g., software) embodying any one or more of the methodologies or functions described herein. The instructions may also reside, completely or at least partially, within the memory 218 and within the processor(s) 202 during execution thereof by the computing device 102. The memory 218 and the processor(s) 202 also may constitute machine readable media 216.

In various embodiments, memory 218 generally includes both volatile memory and non-volatile memory (e.g., RAM, ROM, EEPROM, Flash Memory, miniature hard drive, memory card, optical storage (e.g., CD, DVD), magnetic cassettes, magnetic tape, magnetic disk storage (e.g., floppy disk, hard drives, etc.) or other magnetic storage devices, or any other medium). Additionally, in some embodiments, memory 218 includes a SIM (subscriber identity module) card, which is a removable memory card used to identify a user of the computing device 102 to a service provider network, such as a telecommunication service provider network. Memory 218 can also be described as computer storage media and may include volatile and nonvolatile, removable and non-removable media implemented in any method or technology for storage of information, such as computer readable instructions, data structures, program modules, or other data.

As illustrated in FIG. 2, the memory 218 stores data and modules 220-226. These data and modules 220-226 include availability probabilities 220. In various embodiments, the availability probabilities 220 are fractions, percentages, or decimals that are accessible by one or more of the modules 222-226 or by other modules, processes, threads, or applications. As mentioned above, the availability probabilities 220 stored by the computing device 102 include an availability probability associated with the local environment 120 and an availability probability associated with the environment between the computing devices 102 and 104. The availability probabilities 220 represent averages, medians, or other statistically significant numbers of available channels divided by the total number of channels. Continuing with the example described in FIG. 1, the availability probability for the local environment 120 may be 8/10 (reduced to 4/5), representing 8 available channels and 10 total channels. The availability probability for the environment between the computing devices 102 and 104 may be 8/10 (reduced to 4/5) representing 8 available channels and 10 total channels.

In some embodiments, the availability probabilities 220 may be learned by the computing device 102 based on one or more previous communications with the computing device 104. The learning may make use of any of the numerous machine learning techniques known in the art. In one implementation, the computing device 102 may make use of previously received maps of available channels of the local environment 120. Using these maps, the computing device 102 may determine an average number of available channels, a median number of available channels, a most frequently appearing number of available channels, or some other statistically significant metric.

In other or additional embodiments, the computing device 102 receives the availability probabilities 220 from another device, such as a remote server. The computing device 102 might, for example, determine its location using a global positioning system (GPS) or other component, provide that location to the remote server, and receive in return an availability probability that can be used for the environment between the computing devices 102 and 104. Also, the computing device 102 could provide an identifier associated with the computing device 104 or its user and receive in return an availability probability associated with the local environment 120.

In various embodiments, the local environment module 222 may be any one or more applications, modules, threads, or processes stored in memory 218 and configured to be executed by processor(s) 202. The local environment module 222 may be invoked by another application or process in response to user input indicative of a desire to communicate with another user or device, such as the user of computing device 104. In other embodiments the communication may be triggered automatically by an application, that application then invoking the local environment module 222. Upon being invoked, the local environment module 222 interacts with the interfaces 204, transceivers 208, or any other component of the computing device 102 to cause that component to scan a frequency spectrum for devices using channels of that spectrum. The scanned frequency spectrum may be selected by a user or specified by an application. As mentioned above, the component performing the scan may have a limited range that defines the local environment 110. In FIG. 1, for example, the computing device 102 determines that devices 112 and 114 in local environment 110 are using channels 116 and 118, respectively. In one embodiment, the computing device 102 also determines the type of a device using one of the channels 108 and, if the device does not have a specified type (such as a type associated by a law or regulation with the scanned frequency spectrum), the computing device 102 ignores the use by the device of the one of the channels 108.

Based on results of the scan, the local environment module 222 constructs a list of available channels that includes all channels 108 of the scanned frequency spectrum except those determined by the scan to be used by devices in the local environment 110. Continuing with the above example, the local environment module 222 constructs a list that includes channels 1 and 4-10 since channels 2 and 3 would be determined to be in use by devices of the local environment 110. After constructing the list, the local environment module 222 invokes the channel discovery module 224 and provides the channel discovery module 224 with the constructed list.

Figure 3:
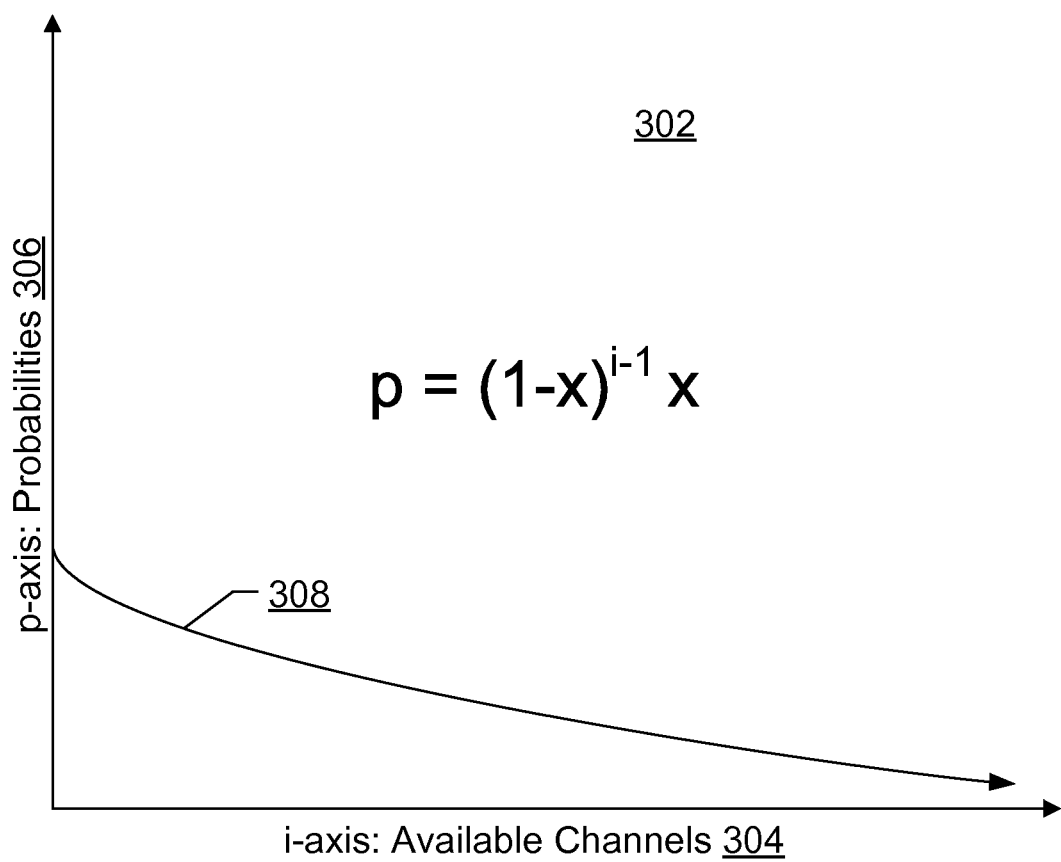
FIG. 3 illustrates an example of a distribution curve with an exponential decay, in accordance with various embodiments.

In various embodiments, the channel discovery module 224 may be any one or more applications, modules, threads, or processes stored in memory 218 and configured to be executed by processor(s) 202. Upon being invoked by the local environment module 222, the channel discovery module 224 calculates or selects a parameter that is used in selecting a channel. In some embodiments, the parameter is calculated using the availability probabilities 220—retrieved by the channel discovery module 224 from memory 218—and an additional parameter. If the parameter is represented as x and the computing device is computing device 102, x may be defined as $x=(1/6)p_2 q$, where $p_2$ is the availability probability for the local environment 120, q is the availability probability associated with the environment between the computing devices 102 and 104, and (1/6) is the additional parameter. If the computing device is computing device 104, x may be defined as $x=(1/6)p_1q$, where $p_1$ is the availability probability for the local environment 110. Continuing with the above example, $p_2$ is 4/5 and q is 4/5. Thus, x is (1/6)(4/5)(4/5), or 8/75. In other embodiments, rather than calculating a parameter, the channel discovery module 224 selects a parameter, such as a randomly selected parameter below a threshold (e.g., 1/6) or a randomly selected parameter that is defined by choosing the values $2^{-i}$, where i represents positive whole numbers starting with 1 with probability proportional to $1/i^2$ After calculating, selecting, or otherwise determining the parameter, the channel discovery module 224 utilizes the parameter to define a distribution curve with an exponential decay that is used by the channel discovery module 224 to calculate selection probabilities for channels that are determined to be open by the local environment module 222. An example exponentially decaying distribution module is illustrated in FIG. 3. As shown in FIG. 3, a graph 302 having an i-axis 304 for available channels and a p-axis 306 for selection probabilities includes an exponentially decaying distribution curve 308. The i-axis 304 refers to numbers associated with available channels, which may differ from the channels number within the plurality of channels 108. For example, the second available channel (i=2) is channel 6 in the plurality of channels. In various embodiments, the exponentially decaying distribution curve 308 is defined as $p=(1-x)^{i-1}x$, where x is the parameter calculated, selected, or determined by the channel discovery module 224. Continuing with the above example, where x is 8/75, the exponentially decaying distribution curve 308 is $p=(67/75)^{i-1}(8/75)$. Using this exponentially decaying distribution curve 308, the selection probability for the first available channel is 8/75 (approximately 1/9), the selection probability for the second available channel is approximately 1/10, the selection probability for the third available channel is approximately 1/12, and so on.

In some embodiments, the channel discovery module 224 then uses the calculated selection probabilities to select an available channel. Because the selection probabilities are defined by a distribution curve with an exponential decay, such as distribution curve 308, it is statistically more likely that the first available channel will be selected than the second, and statistically more likely that the second available channel will be selected than the third. But since there is some probability of any available channel being selected, any of the available channels may be selected by the channel discovery module 224 based on the selection probabilities. Also, the other computing device 104 selects its available channel independently of the computing device 102, possibly using a different parameter and a different set of available channels. After selecting an available channel, the channel discovery module 224 invokes the communication module 226 and provides the communication module 226 with the selected available channel.

In various embodiments, the communication module 226 may be any one or more applications, modules, threads, or processes stored in memory 218 and configured to be executed by processor(s) 202. Upon being invoked by the channel discovery module 224 and receiving the selected available channel, the communication module 226 attempts to communicate with the computing device 104 over the selected available channel during a time period referred to herein as a "time slot." The time slot may be any specified or selected time period, such as thirty seconds. The time slot used by the communication module 226 may be the same as the time slot used by computing device 104 or may be different. Also, the time slots used by the first and second computing devices 102 and 104 may be synchronized, beginning and ending at a same time as each other, or may begin and end at different times.

The communication module 226 may determine whether communication is successful based on user behavior, such as conversation or key words within a conversation, or using any other mechanism known in the art. If the end of a time slot is reached and communication has not been successful, the communication module 226 invokes the channel discovery module 224 to select another available channel, which may be the same available channel or a different available channel. The channel discovery module 224 selects an available channel and invokes the communication module 226 to attempt communication on the new, selected available channel. This loop may repeat until communication with the computing device 104 is successful.

In some embodiments, when the computing devices 102 and 104 successfully communicate, the communication module 226 transmits a map of available channels detected by the local environment module 222 (i.e., the constructed list of available channels) to the computing device 104 and receives in return a map of available channels in the local environment 120. After receiving exchanging the maps, the communication module 226 invokes the channel discovery module 224 to select another available channel for further communication.

In response to being invoked to select another available channel, the channel discovery module 224 utilizes the exchanged maps to select a uniformly chosen mutually available channel. This other available channel is selected in order to preserve a uniform distribution of occupied ones of the plurality of channels 108. In one implementation, the other available channel may be a channel having a relatively lower selection probability than that of the available channel on which the computing devices 102 and 104 successfully communicated. Upon selecting the other available channel, the channel discovery module 224 invokes the communication module 226 and notified the communication module 226 of the other available channel, enabling the communication module 226 to switch to the other available channel and continue communication on the other available channel. Both the computing devices 102 and 104 may use the same selection algorithm for the other available channel, enabling both to select the same other available channel so that when each switches, communication is preserved.

Example Operations

Figure 4:
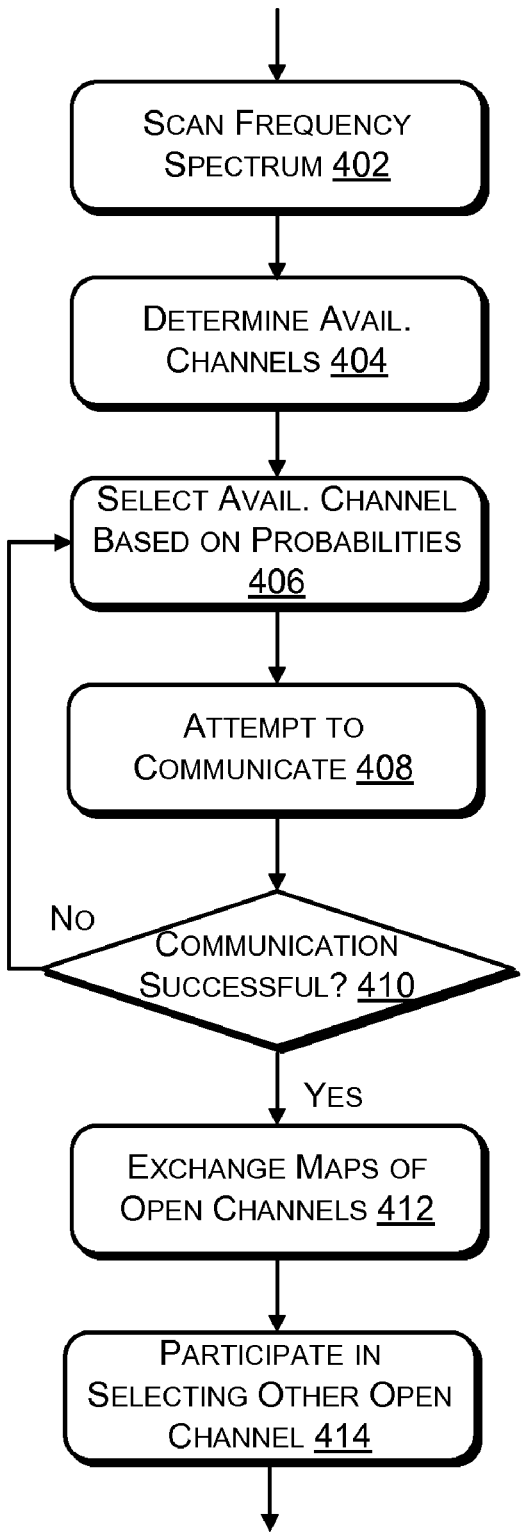
FIG. 4 illustrates a flowchart showing example operations for selecting an available channel and attempting to communicate on the selected available channel, in accordance with various embodiments.

FIG. 4 illustrates a method of selecting an available channel and attempting to communicate on the selected available channel, in accordance with various embodiments. In the method, operations are summarized in individual blocks. The operations may be performed in hardware, or as processor-executable instructions (software or firmware) that may be executed by one or more processors. Further, the method may, but need not necessarily, be implemented using the arrangement of FIG. 1. Consequently, by way of explanation, and not limitation, the method is described in the context of FIG. 1.

As illustrated at block 402, a computing device 102 scans a frequency spectrum that includes a plurality of channels 108. In some embodiments, the computing device 102 is a mobile device. Also, the frequency spectrum may be, but is not limited to, a television (TV) band between 512 MHz and 698 MHz.

At block 404, the computing device 102 determines available channels of the plurality of channels 108 based at least in part on channels that are occupied in a local environment 110 of the computing device 102.

At block 406, the computing device 102 selects one of the available channels 106 based on selection probabilities for the available channels, the selection probabilities defined by an distribution curve 308. In some embodiments, the distribution curve 308 is defined based at least in part on one or both of an availability probability for a local environment 120 of a computing device 104 or an availability probability for an environment between the computing devices 102 and 104. The availability probabilities may be learned based on previous communication attempts or may be received from another device. Also, one of the selection probabilities for an $i^{th}$ available channel may be defined by the distribution curve $(1-x)^{i-1}x$, x being a parameter (in some embodiments, x is different for each computing device 102/104, with each computing device 102/104 using the availability probability of its counterpart). That parameter x may in turn be defined as $(1/6)p_2q$, $p_2$ being an availability probability for a local environment 120 of the computing device 104 and q being an availability probability for an environment between the computing devices 102 and 104 or as $(1/6)p_1q$, $p_1$ being an availability probability for a local environment 110 of the computing device 102. The parameter x may also be a randomly selected number, bypassing the need to know the availability probabilities for the environment of the second computing device and/or the environment between the first and second computing devices. For example, x may be defined by choosing the values $2^{-i}$, where i represents positive whole numbers starting with 1 with probability proportional to $1/i^2$.

At block 408, the computing device 102 attempts to communicate with the computing device 104 on the selected one of the available channel 106. The computing device 102 then determines, at block 410, whether communication with the computing device 104 was successful. If not successful, the computing device 102 repeats the selecting at block 406 and the attempting at block 408 until the computing device 102 successfully communicates with the computing device 104. In various embodiments, the total number of attempts to communicate is independent of a total number of channels 108.

At block 412, the computing device 102 exchanges maps with the computing device 104 of available channels in environments 110 and 120 of the computing devices 102 and 104. The computing device 102 then, at block 414, participates with the computing device 104 in selecting another available channel for further communication based at least in part on the exchanged maps. In some embodiments, the other available channel is a uniformly chosen mutually available channel, the other available channel being switched to in order to preserve a uniform distribution of occupied ones of the plurality of channels.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method comprising:
   determining, by a first computing device, available channels of a plurality of channels based at least in part on channels that are occupied in a local environment of the first computing device;
   selecting, by the first computing device, one of the available channels based on selection probabilities for the available channels, the selection probabilities defined by a distribution curve that has an exponential decay; and
   attempting, by the first computing device, to communicate with a second computing device on the selected one of the available channels, wherein the distribution curve is based at least in part on one or both of an availability probability for an environment of the second computing device or an availability probability for an environment between the first and second computing devices.

2. The method of claim 1, further comprising performing the selecting and the attempting until the first and second computing devices successfully communicate.

3. The method of claim 2, wherein a total number of attempts to communicate is independent of a total number of the plurality of channels.

4. The method of claim 1, wherein the availability probabilities are learned based on previous communication attempts or are received from another device.

5. The method of claim 1, wherein one of the selection probabilities for an $i^{th}$ available channel is defined by the exponentially decaying distribution curve as $(1-x)^{i-1}x$, x being a parameter.

6. The method of claim 5, wherein x is defined as $(1/6)p_2q$, $p_2$ being an availability probability for an environment of the second computing device and q being an availability probability for an environment between the first and second computing devices.

7. The method of claim 5, wherein x is randomly chosen, bypassing the need to know the availability probabilities for the environment of the second computing device and/or the environment between the first and second computing devices.

8. The method of claim 7, wherein the distribution for randomly choosing x is defined by choosing the values $2^{-i}$, where i represents positive whole numbers starting with 1 with probability proportional to $1/i^2$.

9. The method of claim 1, further comprising:
   exchanging maps with the second computing device of available channels in environments of the first and second computing devices; and
   participating with the second computing device in selecting another available channel for further communication based at least in part on the exchanged maps.

10. The method of claim 9, wherein the other available channel is a uniformly chosen mutually available channel, the other available channel being switched to in order to preserve a uniform distribution of occupied ones of the plurality of channels.

11. The method of claim 1, wherein the determining includes scanning a frequency spectrum that includes the plurality of channels.

12. The method of claim 11, wherein the frequency spectrum is an ultra high frequency television (UHF-TV) band between 512 MHz and 698 MHz.

13. The method of claim 1, wherein at least one of the first and second computing devices is a mobile device.

14. A computing device comprising:
   a processor; and
   a plurality of executable instructions configured to be operated by the processor to perform operations including:
      determining available channels of a plurality of channels based at least in part on channels that are occupied in a local environment of the computing device;
      selecting one of the available channels based on selection probabilities for the available channels, the selection probabilities defined by an exponentially decaying distribution curve, the exponentially decaying distribution curve being based at least in part on one or both of an availability probability for an environment of another computing device or an availability probability for an environment between the computing device and the other computing device; and attempting to communicate with the other computing device on the selected one of the available channels.

15. The computing device of claim 14, wherein the plurality of executable instructions are further configured to perform the selecting and attempting until the computing device and the other computing device successfully communicate.

16. The computing device of claim 14, wherein the plurality of executable instructions are further configured to:
exchange maps with the other computing device of available channels in the environments of the computing device and the other computing device; and
participate with the other computing device in selecting another available channel for further communication based at least in part on the exchanged maps, wherein the other available channel is a uniformly chosen mutually available channel, the other available channel being switched to in order to preserve a uniform distribution of occupied ones of the plurality of channels.

17. The computing device of claim 14, wherein the plurality of executable instructions are further configured to scan a frequency spectrum that includes the plurality of channels in order to determine the available channels.

18. A computer-readable storage device comprising:
a plurality of executable instructions stored on the storage device and configured to program a computing device to perform operations including:
determining available channels of a plurality of channels based at least in part on channels that are occupied in an environment of the computing device;
until the computing device successfully communicates with another computing device,
selecting one of the available channels based on selection probabilities for the available channels, the selection probabilities defined by an exponentially decaying distribution curve, the exponentially decaying distribution curve being based at least in part on availability probabilities for an environment of the other computing device and for an environment between the computing device and the other computing device; and
attempting to communicate with the other computing device on the selected one of the available channels;
exchanging maps of available channels in the environments of the computing device and the other computing device with the other computing device; and
participating with the other computing device in selecting another available channel for further communication based at least in part on the exchanged maps.

19. The computer-readable storage device of claim 18, wherein a total number of attempts to communicate is independent of a total number of the plurality of channels.

* * * * *